United States Patent [19]

Moriwaki et al.

[11] Patent Number: 4,636,582
[45] Date of Patent: Jan. 13, 1987

[54] SIGNAL INPUT SHEET HAVING A CONDUCTIVE SHIELD LAYER

[75] Inventors: Masafumi Moriwaki; Shigeaki Sano, both of Hachioji; Eiichi Tanaka, Koganei, all of Japan

[73] Assignee: Toppan Moore Co., Ltd., Tokyo, Japan

[21] Appl. No.: 645,441

[22] Filed: Aug. 29, 1984

[30] Foreign Application Priority Data

Aug. 31, 1983 [JP] Japan ................................ 58-160035

[51] Int. Cl.⁴ ............................................. G08C 21/00
[52] U.S. Cl. ........................................ 178/18; 178/19
[58] Field of Search ............................. 178/18, 19, 20; 340/706, 709, 711

[56] References Cited

U.S. PATENT DOCUMENTS 3,911,215 10/1975 Hurst et al. ............................ 178/18
4,194,083 3/1980 Abe et al. ................................ 178/18

Primary Examiner—Stafford D. Schreyer
Attorney, Agent, or Firm—Weingarten, Schurgin, Gagnebin & Hayes

[57] ABSTRACT

The present invention discloses a sheet-like input device wherein a conductive layer and a resistance layer are arranged in an isolated state up and down, one layer of the conductive layer and the resistance layer which is at least positioned on the upper layer side is formed from a flexible sheet layer, and writing pressure points of the conductive layer and the resistance layer contact according to writing pressure from a sheet surface whereby a variable electric circuit is formed to obtain a position signal, a signal input sheet characterized in that a conductive shield layer is provided on the upper surface of the layer positioned on the upper layer side through an insulating layer, the shield layer being connected to an earth, and a method for producing the same.

3 Claims, 10 Drawing Figures

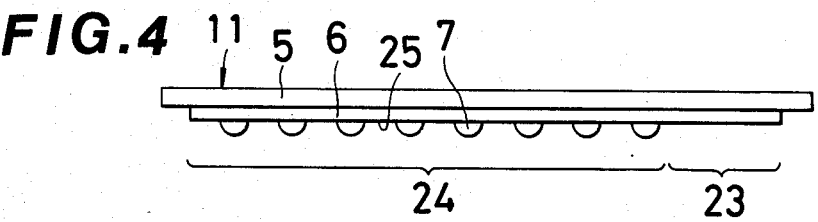
FIG. 4
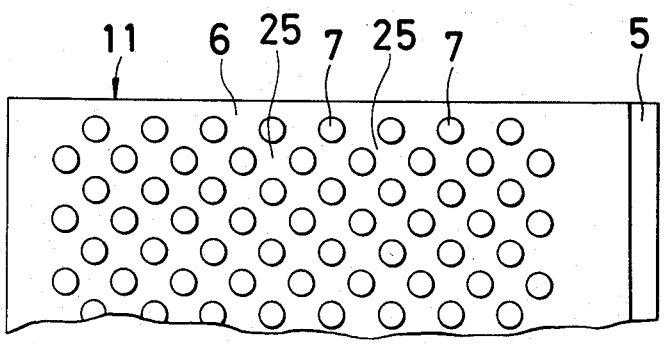
FIG. 5
FIG. 7
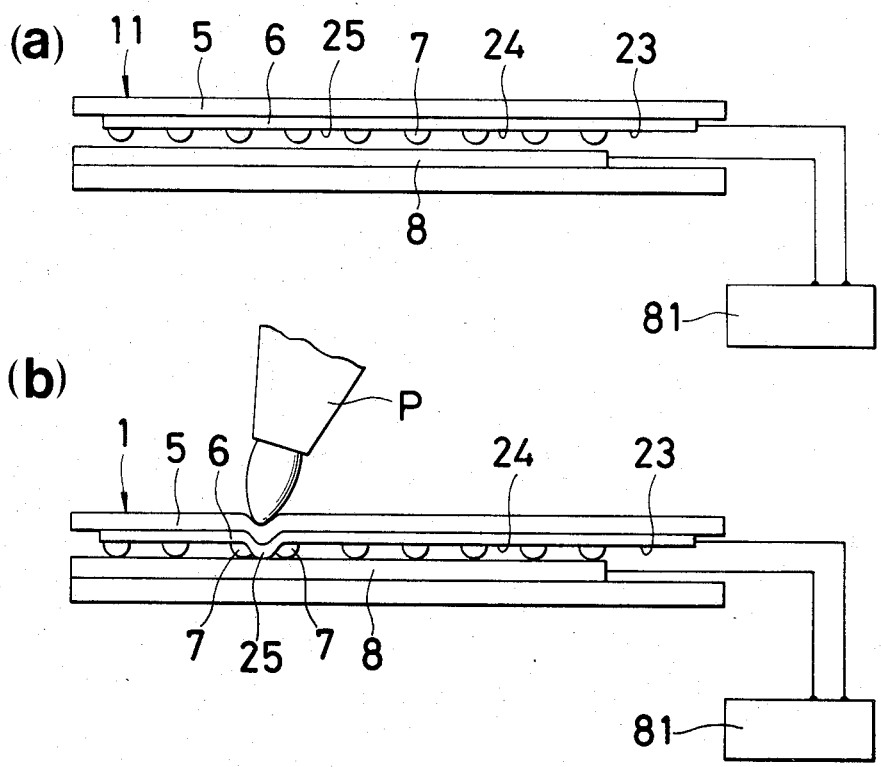

SIGNAL INPUT SHEET HAVING A CONDUCTIVE SHIELD LAYER

BACKGROUND OF THE INVENTION (1) Field of the Invention

This invention relates to a signal input sheet used to input a signal at a desired position of a sheet surface in response to pressure of said position.

(2) Description of the Prior Art

Various online real-time character recognition devices have been known which recognize information while describing the information to input hand-written information (see Japanese Patent Application Laid-Open Nos. 56-124973 and 56-124976). As hand-written information input devices used for these devices, various sheet-like input devices have been known which utilize distortion of a sheet surface due to the writing pressure when informatiion is described on the sheet surface to obtain a position signal with the variation of writing order.

In this sheet-like input device, it is designed so that a conductive surface is positioned in an isolated state on a basic resistance surface which is a detecting base plate, and the conductive surface comes into contact with the basic resistance surface according to writing pressure to form a variable electric circuit to sequentially obtain position signals. Known as the isolated structure of the conductive surface to the basic resistance surface includes an arrangement of pressure sensitive conductive rubber in which a conductive material is discontinuously distributed into a rubber material so that at writing pressure, the conductive material may obtain a conductivity continuously, and an arrangement of the meshes of a net in which a sheet bored with holes such as the meshes of a net is interposed between the basic resistance surface and the conductive surface, and at writing pressure, the conductive surface comes into contact with the basic resistance surface through the meshes of a net to obtain a conductivity (see Japanese Patent Publication No. 59-7992).

Generally, a signal input sheet is extended on a detecting surface of the hand-written information input device, as described above, and information is written into the signal input sheet. In this case, human hands inevitably touch the signal input sheet, and therefore, there poses disadvantages that electric charge charged in a human body, so-called static electricity passes through the signal input sheet to affect the device body, materially lowering a recognition rate and image resolution due to the disturbance of input information.

Furthermore, in the arrangement of pressure sensitive conductive rubber in the aforementioned signal input sheet, in the manufacture of conductive rubber, unevenness occurs in distribution of a conductive material. Where in use, a pressure area is wide, there is less problem but in case of variation in pressure of a small area such as writing pressure, the desired conductivity is hard to obtain to pose various problems. Moreover, where a writing area is wide, materials of conductive rubber having high precision and high quality are required but ones having a wide area are hard to obtain, resulting many inconveniences in terms of technical and economical terms.

In the arragement of a sheet of meshes of a net, the sheet itself has a discontinuity, and therefore, a portion for obtaining a conductivity is discontinuous. In those to which is applied longitudinal, lateral and oblique writing pressure, if the pressure is applied to a continuous portion of the sheet, it is not possible to obtain the conductivity, and also in case a continuous signal of high density is obtained, it is impossible to do so.

SUMMARY OF THE INVENTION

This invention has been achieved in consideration of disadvantages noted above with respect to prior art. The present invention overcomes the disadvantages noted above with respect to prior art by a sheet-like input device wherein a conductive layer and a resistance layer are arranged in an isolated state up and down, one layer of said conductive layer and resistance layer which is at least positioned on the upper layer side is formed from a flexible sheet layer, and writing pressure points of the conductive layer and resistance layer contact according to writing pressure from a sheet surface whereby a variable electric circuit is formed to obtain a position signal, improvement wherein a conductive shield layer is provided on the upper surface of said layer positioned on the upper layer side through an insulating layer, said shield layer being connected to an earth.

In addition, the present invention provides a sheet-like input device in which a conductive layer and a resistance layer are arranged in an isolated state up and down, the device having a construction which can not only obtain the desired states such as a size of pressure area in the signal input, extent of a sheet area, directivity of pressure such as writing pressure, continuity of signal, etc. but easily obtain the desired writing aptitude and various durabilities in writing implements such as normal ball-point pens, pencils and the like.

BRIEF DESCRIPTION OF THE DRAWINGS

FIG. 4 is an explanatory view in section of a signal input sheet in accordance with this invention;

FIG. 5 is an explanatory view for the backside of the signal input sheet of FIG. 4;

FIG. 7 is an explanatory view for the using state of the signal input sheet in accordance with the present invention;

DESCRIPTION OF THE PREFERRED EMBODIMENTS

In the present invention, a shield layer provided on the upper surface side of the sheet-like input device shields (electrostatic shields) an external electrostatic field such as an electric charge charged in the human body so that the hand-written information input device body may not undergo the influence of the external electrostatic field.

In a sheet-like input device in which a conductive layer and a resistance layer are arranged in an isolated state up and down, there is provided a signal input sheet wherein a conductive layer is provided on the backside of a flexible sheet by a conductive ink, and a dot-like insulating material having a predetermined height including a material bonded to the conductive layer is provided on the conductive layer to form a signal input sheet whereby when dot pressure is applied from the upper surface side of the sheet, the insulating material is forced to be spread with a depression of an electric point contact surface of the sheet and conductive layer, the conductive portion comes into contact with a detecting surface which is a resistance surface to sequentially input position signals and to provide a stabilized entry which is excellent in writing aptitude.

EMBODIMENTS

The signal input sheet of the present invention will now be described in detail by way of an embodiment shown in FIGS. 1 to 9.

Figure 1:
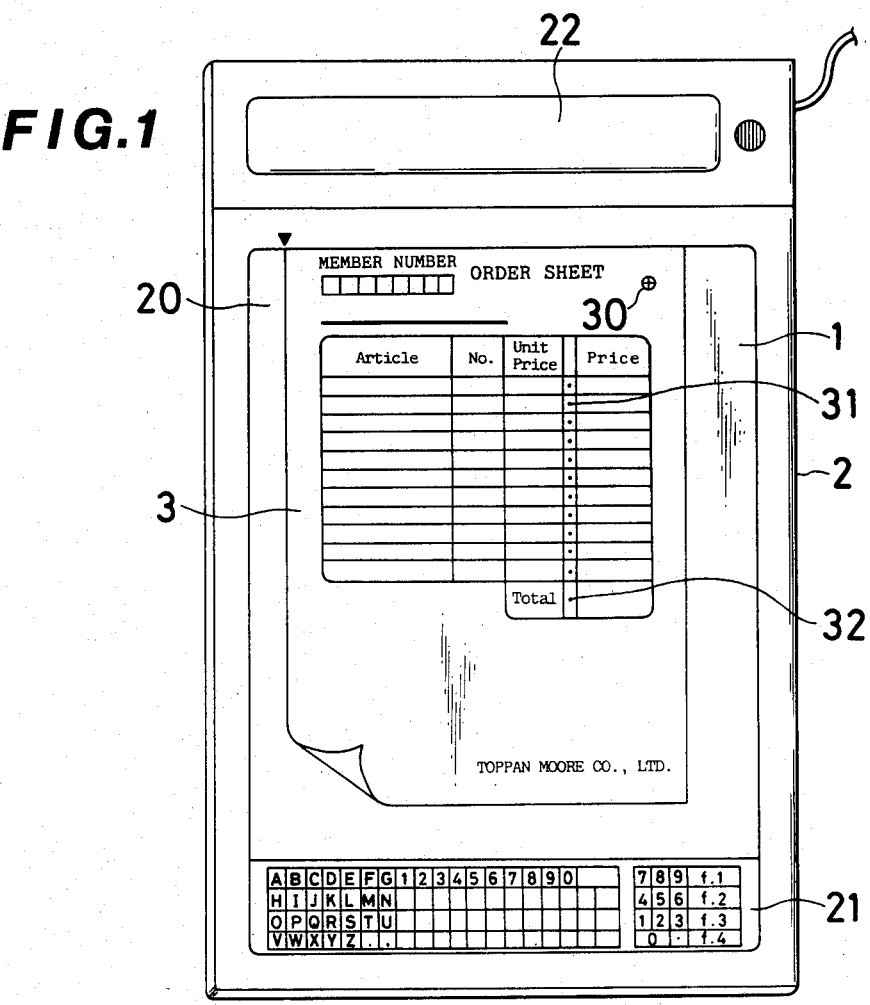
FIG. 1 is an explanatory view of a hand-written form input device using a signal input sheet in accordance with the present invention.
Figure 2:
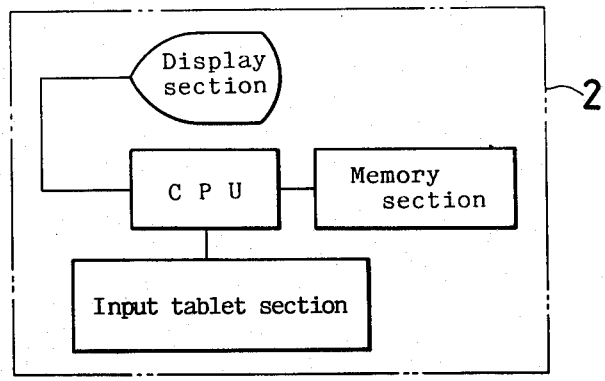
FIG. 2 is an explanatory view showing the strucuture of the hand-written form input device.
Figure 3:
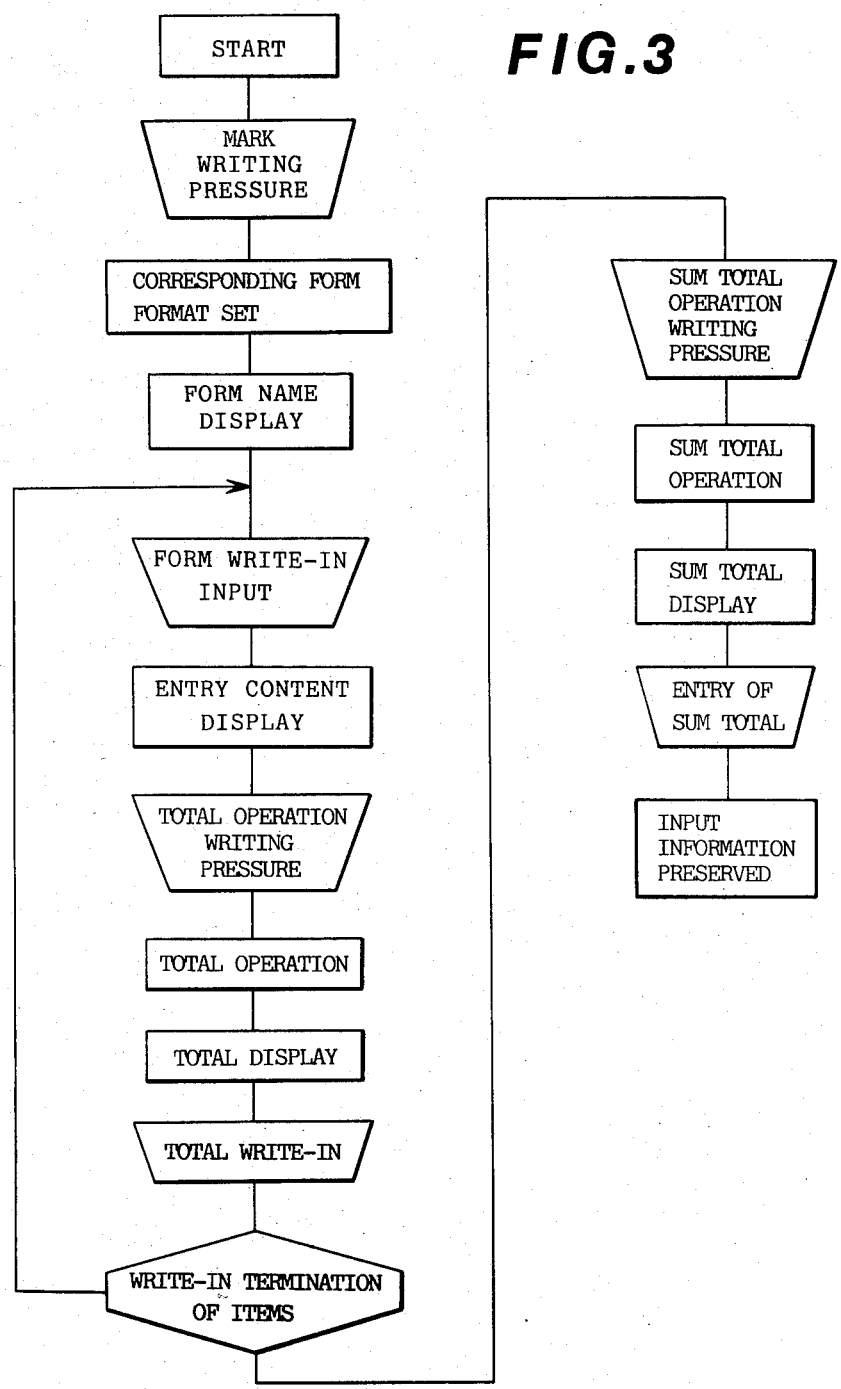
FIG. 3 is a flow chart shwing the processing procedure in the hand-written form input device.
Figure 6:
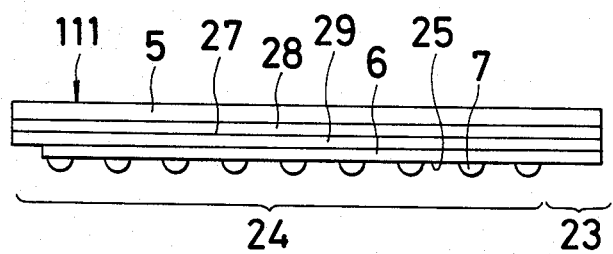
FIGS. 6(a) and (b) are respectively an explanatory view in section and an explanatory view in surface of another embodiment in accordance with this invention.
Figure 6:
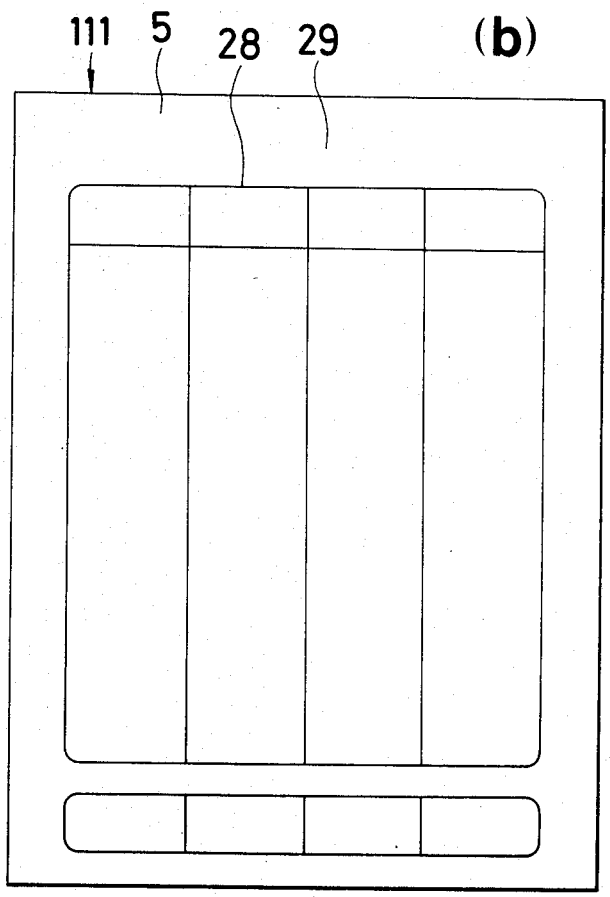

Referring to FIGS. 1 to 3, the state wherein the signal input sheet is used will be described. FIG. 1 shows a hand-written form input device 2 in which a signal input sheet 1 in accordance with the present invention is incorporated. A form place area 20 with a signal input sheet 1 extended thereon is provided on the upper surface of the hand-written form input device 2, and a form 3 is placed on the form place area 20 to write information on the form by hand-writing and at the same time to provide signal input. A key pattern display 21 is provided on the signal input sheet 1 and adjacent to the form place area 20. The key pattern display 21 is divided to display characters, numeric characters, symbols and the like, wherein writing pressure is applied to the desired character, numeric character, symbol and the like to thereby auxiliarily perform corresponding key inputs. On the hand-written form input device 2 is provided a liquid crystal display 22, in which input signals are displayed, operation results and input indications are displayed, and input, operation and processing procedures may be assured.

In the hand-written form input device 2, a variety of forms different in use and forms different in layout may be inputted. Even if the forms 3 are different in size, an upper side or the upper side and a side can be locked to predetermined places. When writing pressure is applied to a form classification indicating mark 30 provided at a position for every form relative to the form place area surface when the form 3 is placed on the form place area 20, a form format corresponding to the form 3 from a memory in which a plurality of form formats are registered is set to an input tablet section of the form place area 20 as shown in FIG. 2. Information and operation inputted into the format 3 in accordance with the form format are processed by CPU, and input contents and operation results are displayed on the display section 22. For example, on the basis of a format (order sheet) placed on the signal input 1 of the hand-written form input device 2 shown in FIG. 1, the processing procedure will be described with reference to a flow chart shown in FIG. 3. When writing pressure is applied to the form classification indicating mark 30 (mark writing pressure) is applied after the form 3 has been set to a predetermined position, a form format corresponding to the form 3 is set to the input tablet section, that is, on the signal input sheet 1 (corresponding form format is set).

A form name is then displayed on the display section 22 (form name is displayed), and after it has been assured to be identical with a form name of a form placed, a write-in input into the form starts (form write-in input). If names of clients, member numbers, etc. are entered and name of articles, numbers, unit prices, etc. of order contents of order sheets are entered in said order, contents entered are displayed on the display section 22 every time (contents entered are displayed), and therefore, entry can be made while confirming the matter. When writing pressure is applied to a total entry mark 31 (total operation writing pressure), the total result is calculated (total operation) and is displayed on the display section 22 (total is displayed) and therefore writing can be made in accordance with said display (total is written in). After writing of necessary items has been terminated (writing of necessary items is terminated), the sum total is also displayed by applying writing pressure to the sum total entry mark 32 (the sum total operation writing pressure), and therefore, if writing is likewise made, write-in input work to the form can be performed simply (sum total operation) (sum total display) (sum total entry) (input information preserved).

In the aforementioned hand-written form input device 2, a position signal by writing pressure to a single form classification indicating mark 30 is inputted on the signal input sheet 1 with the form 3 to be processed locked a predetermined place, to select a form format. Alternatively, however, a form is placed on the desired place on the signal input sheet 1 of the form 3, at least two form position indicating marks are provided on the form 3, whereby it is possible to judge at what direction and at what state the form 3 placed by the form position indicating marks is placed, and the form 3 can be subjected to input processing at that position. It will be noted in this case that there is judged as a classification signal of a form by a spacing between two form position indicating marks to select a form format.

FIG. 4 is an explanatory view in section of a signal input sheet in accordance with the present invention. This signal input sheet 11 has a size of A4 format, and conductive ink whose main components comprise a fine powder of carbon black and a polyurethane resin is used to evenly provide a conductive layer 6 of thickness 0.01 mm on a predetermined surface of the backside of a polyurethane film sheet of thickness 0.55 mm using a whole-surface screen solid impression plate by screen printing process. The conductive surface 6 has two surfaces, one for an electric contact surface 23 and the other for an electric point contact surface 24. Insulating ink whose main components comprise titanium oxide and polyurethane resin selected from an inorganic material or pigment is used as an ink reducer material, a flow preventive material and a height retainer material to coat the ink about the height of average 0.08 mm on the electric point contact surface 24 using a screen plate having holes of average diameter 0.05 mm with a spacing between obliquely adjoining holes being average 0.20 mm by screen printing process to provide a dot-like insulating material 7 of average diameter 0.10 mm, spacing 0.10 mm and height 0.06 mm, as shown in FIG. 5. The portion of the insulating material 7 comprises a non-contact portion, and the other portions comprise a conductive portion 25 which is a point contact portion.

FIGS. 6(a) and (b) are respectively an explanatory view in section and an explanatory view in surface of a signal input sheet 111 of a further embodiment in accordance with the present invention. This signal input sheet 111 comprises a transparent polyurethane film sheet 5 the backside of which is applied with appearance printing 25 such as area printing and solid printing with respect to a description column, an operation column, a figure, a symbol, a description, etc., in single color or multi-color, and the conductive layer 6 and the insulating layer 7 are provided thereon in a manner similar to the embodiment shown in FIG. 1.

When in the appearance printing 27, the area printing 51 is effected with a first color and the solid printing 29 is effected with a second color different from the first color, there assumes a state as if a white or colored printed sheet is placed under the transparent sheet 5, and impression pressure can be directly applied to the surface of the sheet 5.

FIG. 7(a) shows a state wherein the signal input sheet 11 shown in FIG. 4 is placed over the basic resistance surface 8 which is a detecting surface of a conventional sheet-like input device. In a normal state, the insulating material 7 is interposed between the conductive layer 6 and the basic resistance surface 8, the conductive portion 25 is isolated from the basic resistance surface 8, the whole electric point contact surface 24 is not in contact with the basic resistance surface 8, and a voltage is applied to the electric point contact surface 23 and basic resistance surface 8, an electric circuit formed therefrom is opened.

On the other hand, as shown in FIG. 7(b), when writing pressure is applied to the desired portion by a writing implement P as shown by the arrow during the use, the sheet 5 is depressed. With this, the electric point contact surface 24 is depressed, and with this the insulating material 7 adhered to and integral with the conductive layer 6 is forced to be spread, the conductive portion 25 is moved down to come into contact with the basic resistance surface 8, and the electric point contact surface 24 and basic resistance surface 8 are brought into point contact state. When a voltage is applied to the electric contact surface 23 and basic resistance surface 8, an electric circuit formed therefrom is closed. This electric circuit varies in position of pressure due to variation in writing pressure to thereby form a variable electric circuit. The sheet-like input device analyzes said variable condition and judges a signal due to pressure to convert it into an input signal to a desired device 81.

While in the above-described embodiment, writing pressure is directly applied to the surface of the sheet 5, it will be noted that entry paper, forms or the like are placed on the surface of the sheet 5, and input information is entered on the surface thereof whereby writing pressure can be applied from the surface.

While in the above-described embodiment, a polyurethane film is used for the sheet 5, the sheet is not limited thereto but in consideration of writing aptitude in object of use such as the way of applying pressure, continuity of input signal, various durability and economic property of a point of writing implements, a sheet can be selected which has a tensile strength, elongation, elasticity and flexibility which are suitable therefor. Materials for the sheet 5 include films such as polyethylene, EVA (ethylenevinylacetate copolymer), ionomer resin, polypropylene, cellulose acetate, cellulose acetate butylate, cellulose propyonate, ethyl cellulose, polyvinyl chloride, vinyl chloride-vinyl acetate copolymer, polyvinylidene chloride, polyvinyl alcohol, polymethyl methacrylate, polyamide, polycarbonate, polyester resins. fluoroplastics, rubber hydrochloride, polyimid, polysulphone, etc. In this case, a thickness is an important element and has to be selected along with a thickness of a conductive layer and a height of an insulating portion which will be described later. Where a position signal of writing pressure is removed, a thickness of about 0.01-1 mm can be selected.

While in the embodiment, the conductive layer 6 is that a conductive material is mixed so as to be less than 1000$\Omega$ (A4 format size). Conductive materials include powder of gold, silver, copper, nickel and carbon in consideration of the object of use and economic property. To make these into conductive ink, materials of the same series as the sheet such as acrylic series, epoxy series, phenol series, polyester series, urethane series, silicon series, etc may be selected in consideration of adhesiveness with the aforesaid sheet material. Coating method is not limited to silk screen printing method but may include single or lap printing such as lithography, intaglio or relief, or spray method, or other methods. The thickness of the conductive layer 6 may be determined according to the kind, shape and desired conductivity of the conductive material. The thickness required is 0.002 mm at the minimum, and greater thickness which does not impair flexibility is 0.05, normally in the range of 0.005 mm to 0.02 mm.

Selection of the insulating material 7 using insulating ink forms an important part of this invention. First, it is necessary to select the insulating ink which is at least excellent in adhesiveness with the conductive layer 6. Because, pressure such as writing pressure spreads the insulating material 7 as previously mentioned to peel the insulating material 7, and where said portion is peeled, the electric point contact surface 24 comes into contact with the basic resistance surface in a normal lapped state wherein no writing pressure is applied, thus failing to serve as a signal input sheet. To avoid this, the same series of material as that of material using conductive ink which forms the conductive layer 6 can be used. The volume specific resistance of the insulating material is more than $10^5$ $\Omega$.cm, preferably, more than $10^9$ $\Omega$.cm. Printing method of the insulating material 7 is not limited likewise the printing of the conductive layer 6 but the size, height, density and arrangement thereof need be determined according to material, thickness, tensile strength, elongation, elasticity and flexibility of the sheet 5, shape of the input signal and state of the basic resistance surface. Where writing pressure is converted into signal, the dot diameter is 0.002 mm to 1.0 mm; the height is 0.01 mm to 0.2 mm; and the density (occupancy of unit area) is 5% to 95%.

Moreover, coating pattern of the insulating material 7 by the insulating ink is not limited to the pattern shown in FIG. 2 but the dots of the insulating material 7 can be aligned longitudinally and laterally. Large and small sizes of the dots of the insulating material 7 can be mixed. The insulating material 7 can be provided at random with dots of fine size or can be provided in the form of longitudinal, lateral or oblique stripe or in the form of lattice comprising a combination thereof.

Figure 8:
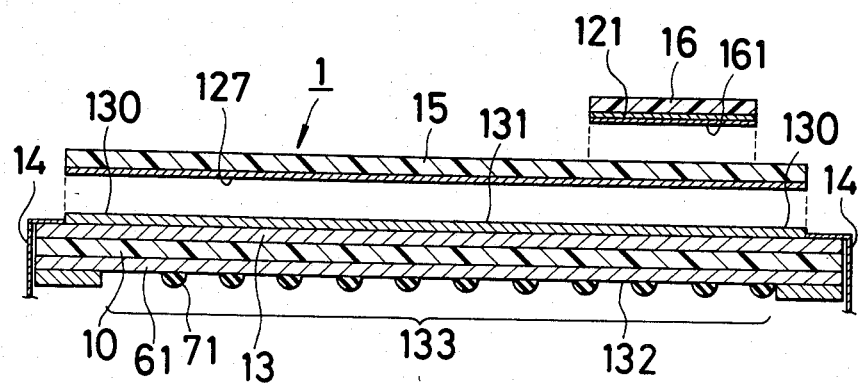
FIG. 8 is an explanatory view showing one embodiment showing one embodiment of the signal input sheet in accordance with the present invention.

Next, an embodiment of the signal input sheet will be described in which as shown in FIG. 8, a shield layer 13 is uniformly provided on the whole upper surface of the signal input sheet, the shield 13 being connected to an earth 14. A cover film 15 is adhered to the surface of the shield layer 13 through a double-coated tape 130 provided on the outer periphery of the surface of the shield layer 13 and non-adhesive paste 131 coated on the surface of the shield layer 13. The backside of the cover film 15 is subjected to single or multicolor appearance printing 127 such as area printing or solid printing for a description column, an operation column, pictures, symbols, an explanation or the like. A reference numeral 16 denotes a key film, which is adhered onto the cover film 15 corresponding to the required position of the detecting surface of the sheet-like input device, and the backside thereof undergoes the appearance printing 121 of key pattern and the non-adhesive paste 161 is coated.

The shield layer 13 is provided through an insulating layer on the upper surface positioned at the upper layer side where the conductive layer and resistance layer are arranged up and down in an isolating state. Where the conductive layer itself is in the form of a sheet from pressure-sensitive conductive rubber other than the aforementioned embodiment, an insulating layer has to be provided on the upper surface of the conductive layer of at least pressure sensitive conductive rubber. Other than an arrangement wherein the cover film 15 is adhered to the shield layer 13, the conductive shield layer itself is designed so that it may serve as a cover. The conductive material of the shield layer 13 may be selected in the range similar to the conductive material of the above-described conductive layer 6.

Figure 9:
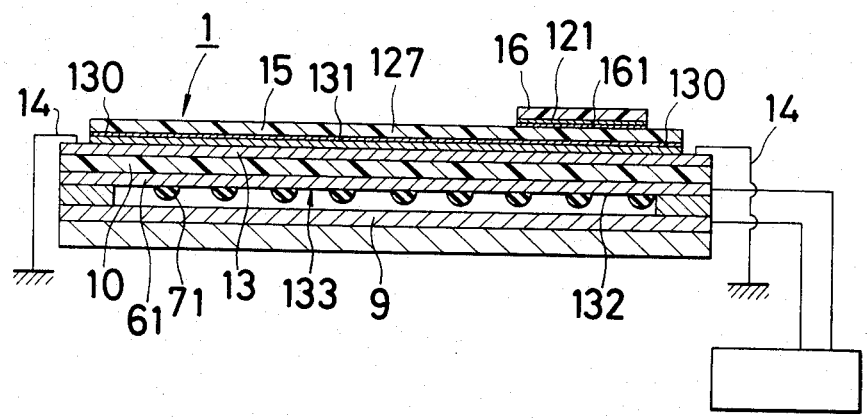
FIG. 9 is an explanatory view showing one embodiment and a basic resistance surface in the hand-written form input device.

FIG. 9 shows a state wherein the signal input sheet 1 shown in FIG. 8 is placed on a basic resistance surface 9 in the input tablet section of the hand-written form input device 2 which is a sheet input device. In a normal state, an insulating material 71 is interposed between a conductive layer 61 and a basic resistance surface 9, the conductive layer 61 and the basic resistance surface 9 being isolated, the whole electric point contact surface 133 is in non-contact state with respect to the basic resistance surface 9, and when voltage is applied to an electric contact surface 132 and the basic resistance surface 9, an electric circuit formed thereby is open.

On the other hand, in use, when writing pressure is applied to a desired portion by a writing implement or the like, the cover film 15 and insulating sheet 10 are depressed, the conductive layer 61 is then depressed and comes into contact with the basic resistance surface 9, the electric point contact surface 133 and the basic resistance surface 9 are in a point contact state, and when voltage is applied to the electric contact surface 132 and basic resistance surface 9, an electric circuit formed thereby is closed. Static electricity charged in human being when writing information will not affect on the conductive layer 61 and basic resistance surface since the shield layer 13 is connected to earth 14 to electrostatic shield the conductive layer 61 and basic resistance surface 9 from the external electrostatic field.

It is noted that the aforesaid earth is not limited in connecting position and the number in the peripheral edge of the shield layer.

Where a device with AC as a power source, for example, a fluorescent lamp, is present in the vicinity of the hand-written information input device, noises generated by the fluorescent lamp are picked up by the hand-written information input device. However, this can be overcome by the provision of a filter (an integration device comprising a condenser and a resistor).

As described above, in the present invention, the conductive shield is provided on the surface of the sheet, and the earth is connected to the shield layer, and therefore, the invention has excellent practical effects in that when information is described, static electricity is shielded by the shield layer without affecting the hand-written form input device body, hand-written inputted information is not disturbed, and the recognition rate of the inputted information is not deteriorated.

In addition, the upper layer side wherein the conductive layer and the resistance layer are arranged up and down in an isolated state is formed from a movable sheet layer comprising a conductive layer, and an insulating material of a predetermined shape comprising an insulating ink is provided on the conductive layer comprising an electric point contact surface surrounding a conductive portion comprising a point contact portion. Therefore, when the electric point contact surface is placed on the detecting surface comprising a resistance layer, the conductive portion will not contact with the detecting surface. When under this state, point pressure is applied from the surface side of the sheet, the insulating material is forced to be spread with depression of the sheet and the electric point contact surface, the conductive portion comes into contact with the detecting surface and the position signals may be inputted sequentially.

Furthermore, even in the case of the depression caused by the point of a writing implement having a larger diameter than the width of the conductive portion with the depression as described above, the insulating material is forced to be spread with the depression of the electric point contact surface and the conductive portion comes into contact with the detecting surface. The present invention, therefore, provides features that various patterns of the conductive portion become easy, and various pressures may be easily converted into the desired position signals.

Because of the fact that the conductive layer and the resistance layer are arranged up and down in an isolated state, in the construction wherein the insulating material using the insulating ink is adhered on the side of the conductive layer arranged upwardly, the insulating material is secured to the backside of a writing surface and therefore, entry which is excellent in writing aptitude and is stabilized can be made and the insulating material itself is very hard to be peeled from the conductive layer and is extremely durable.

What is claimed is:

1. In a sheet-like input device wherein a conductive layer and a resistance layer are arranged in an isolated state up and down, one layer of said conductive layer and said resistance layer which is at least positioned as an upper layer side is formed from a flexible sheet layer, and writing pressure points of the conductive layer and resistance layer contact according to writing pressure from a sheet surface whereby a variable electric circuit is formed to obtain a position signal, a signal input sheet characterized in that a conductive shield layer is provided on the upper surface of said layer positioned as an upper layer side through an insulating layer, said shield layer being connected to an earth.

2. In a sheet-like input device wherein a conductive layer is provided on the backside of a flexible sheet by conductive ink, a predetermined surface of said conductive layer comprises an electric point contact surface, said electric point contact surface comprising a point contact portion and a non-contact portion, a conductive layer sheet provided with an insulating ink including a material adhered to the conductive layer is provided on the conductive layer of said non-conductive portion, a resistance layer is provided under said conductive layer sheet, and writing pressure points of the conductive layer and resistance layer contact according to writing presure from the conductive layer sheet surface whereby a variable electric circuit is formed to obtain a position signal, a single input sheet according to claim 1 characterized in that a conductive shield layer is disposed on said layer positioned as an upper layer side through an insulating layer, said shield layer being connected to an earth.

3. In a signal input sheet characterized in that a conductive shield layer is provided as an upper surface of a layer positioned on a conductive layer separated by an insulating layer, a method for producing a flexible signal input sheet in which said conductive layer, insulating material and shield layer are prepared by coating conductive ink, insulating ink and conductive ink, respectively.

* * * * *

UNITED STATES PATENT AND TRADEMARK OFFICE
CERTIFICATE OF CORRECTION

PATENT NO. : 4,636,582

DATED : January 13, 1987

INVENTOR(S) : Masafumi Moriwaki; Shigeaki Sano, Eiichi Tanaka

It is certified that error appears in the above-identified patent and that said Letters Patent is hereby corrected as shown below:

After the Abstract

"3 Claims, 10 Drawing Figures" should read --3 Claims, 11 Drawing Figures--

Column 1, line 63, "resulting many" should read --resulting in many-- line 65, "arragement" should read --arrangement--

Column 2, line 40, strucuture" should read --structure-- line 42, "shwing" should read --showing-- lines 54-55, "view showing one embodiment showing one embodiment of" should read --view showing one embodiment of--

Column 6, lines 3-4, "res-ins. fluoroplastics" should read --res-ins, fluoroplastics,-- line 19, "etc may" should read --etc., may--

Column 9, line 5, "presure" should read --pressure-- line 7, "a single input sheet" should read --a signal input sheet--

Column 10, line 5, "layer separated" should read --layer and separated

UNITED STATES PATENT AND TRADEMARK OFFICE
CERTIFICATE OF CORRECTION

PATENT NO. : 4,636,582

DATED : January 13, 1987

INVENTOR(S) : Masafumi Moriwaki, Shigeaki Sano, Eiichi Tanaka

It is certified that error appears in the above-identified patent and that said Letters Patent is hereby corrected as shown below:

Column 10, line 7, "layer, insulat-" should read --layer and insulat- --

Column 10, line 8, "material and shield layer are" should read --material are--

Column 10, lines 9-10, "conductive ink, insulating ink and conductive ink, respectively" should read --conductive ink and insulating ink, respectively, on one side of said insulating layer, and said shield layer is prepared by coating conductive ink on the other side of said insulating layer.--

Signed and Sealed this

Twenty-eighth Day of June, 1988

*Attest:*

DONALD J. QUIGG

*Attesting Officer*    *Commissioner of Patents and Trademarks*

UNITED STATES PATENT AND TRADEMARK OFFICE
CERTIFICATE OF CORRECTION

PATENT NO. : 4,636,582

DATED : January 13, 1987

INVENTOR(S) : Masafumi Moriwaki; Shigeaki Sano, Eiichi Tanaka

It is certified that error appears in the above-identified patent and that said Letters Patent is hereby corrected as shown below:

On the title page:

Under "Foreign Application Priority Data", the second priority should be added.

--August 8, 1984 [JP]  Japan..............59-166086--

Signed and Sealed this

Twenty-fifth Day of September, 1990

Attest:

HARRY F. MANBECK, JR.

*Attesting Officer*     *Commissioner of Patents and Trademarks*